R. S. BLAIR.
VEHICLE.
APPLICATION FILED JUNE 18, 1908.
1,070,765.
Patented Aug. 19, 1913.
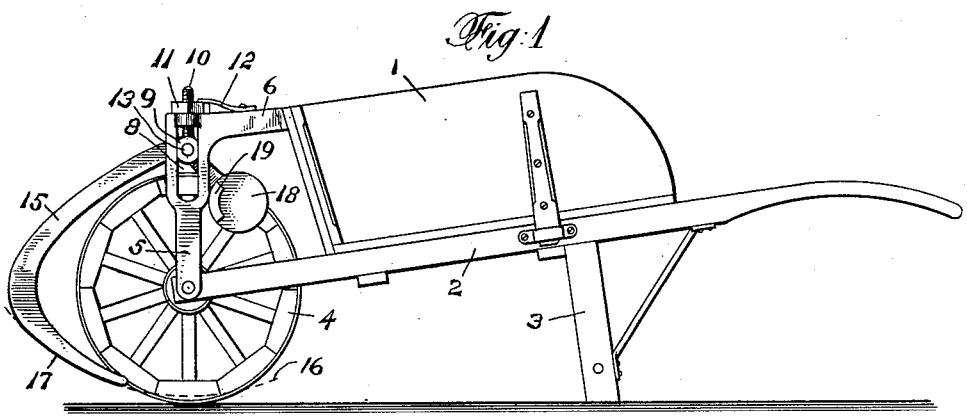
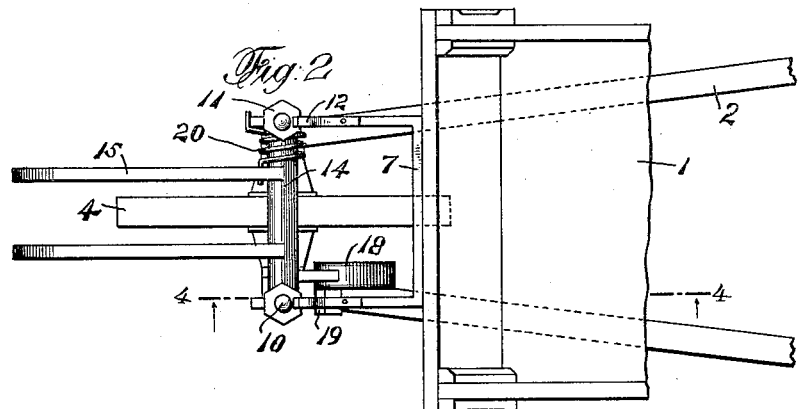
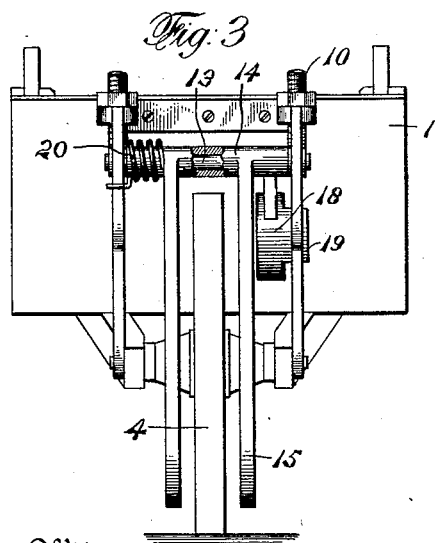
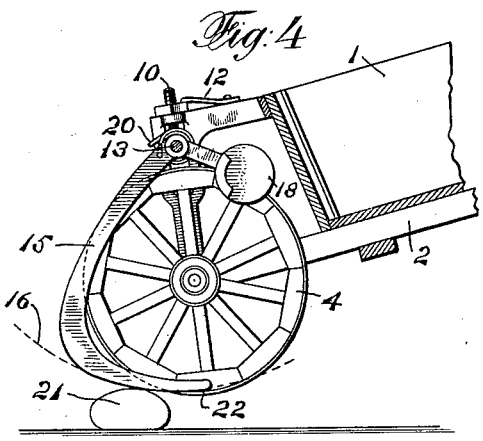
Witnesses:
Inventor
R. S. Blair

UNITED STATES PATENT OFFICE.

ROBERT S. BLAIR, OF NEW YORK, N. Y.

VEHICLE.

1,070,765.   Specification of Letters Patent.   Patented Aug. 19, 1913.

Application filed June 18, 1908. Serial No. 439,185.

*To all whom it may concern:*

Be it known that I, ROBERT S. BLAIR, a citizen of the United States, residing at New York, in the county of New York and State of New York, have invented certain new and useful Improvements in Vehicles, of which the following is a full, clear, and exact description, such as will enable others skilled in the art to which it appertains to make and use the same.

This invention relates to wheeled vehicles.

One of the objects thereof is to provide practical and efficient means in connection with wheeled vehicles, whereby they are rendered better adapted to ride over inequalities and obstructions in the surface of the road.

Another object is to provide simple and automatically acting means whereby a vehicle is given the effect of wheels of an increased diameter in riding over obstacles in its path.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawing, wherein is shown one of various possible embodiments of this invention, Figure 1 is a side elevation thereof. Fig. 2 is a plan. Fig. 3 is a front elevation, certain portions being broken away. Fig. 4 is a sectional view taken substantially on the line 4—4 of Fig. 2, showing the parts in another position.

Similar reference characters refer to similar parts throughout the several views of the drawing.

In order to render certain features more readily and fully understood, it may be noted that in general, and other things being equal, the larger the wheels of a vehicle the easier it rides over an inequality of a given height and abruptness and the less the shock in so doing. The diameter of the wheels, however, is often limited in the aim to achieve stability, lightness, compactness, or other desirable qualities.

The gain of the advantageous features incident to using large wheels without the sacrifice of the last mentioned qualities is among the dominant aims of this invention.

Referring now to the accompanying drawing, there is shown a wheel-barrow comprising a body 1, side rails 2, standards 3 and wheel 4. This wheel-barrow, in so far as the broader features of this invention are concerned, is merely typical of a vehicle of any type, and it may here be noted that the term "vehicle" is used herein and throughout the following claims in a broad sense as comprehending roller skates, children's carriages, and various other wheeled devices with which this invention is adapted for use.

Mounted upon the forward end of the rails 2 are braces 5 which extend upwardly from the bearings of the wheel and thence toward the body 1 as at 6, being preferably connected one with another in integral relation as shown at 7 in Fig. 2. In the embodiment shown the braces 5 are recessed as shown at 8, above the axle of wheel 4 or a little to the rear thereof, and slidably mounted therein are bearings 9 which are adjustable in a vertical direction by the threaded shank 10 and nut 11, the latter being held against upward movement by an abutment 12, which may be, if desired, rigid, but here takes the form of a flat spring to give a cushioning action to any upward thrust brought upon the bearing. Within these bearings, which are substantially identical upon the two sides, is a pin or shaft 13, upon which is loosely journaled a sleeve 14 having rigidly related thereto and preferably cast integral therewith the arms 15. These arms 15, which are here shown as two in number and which extend at each side of the wheel 4, are curved at their lower surface to conform to an arc indicated by the dotted line 16, which is struck from the axis of the arms as a center. Thus, as the arms 15 swing about their axis, their lower surface 17 follows the arc 16. The arms 15 are normally swung forwardly as by a weight 18, their normal position being controlled in any desired manner as by the abutment 19 contacting with the brace 5 and acting as a stop. In order to insure a quicker forward swinging movement of the arms, there is provided a coil spring 20 which coacts with the weight 18 in swinging them forwardly, and it is to be understood that in so far as certain features of this invention are concerned either the weight or spring may be used alone.

It is to be noted that in the general use of this device the bearing or axis of the arms 15 is so adjusted as to bring all portions of the arc 16 above the lowermost portion of the wheel 4, and thus above the surface of a smooth road. This however, may be adjusted to meet varying road conditions either by the means shown or by any of various forms of adjustment to accomplish the end in view.

The action of the above described embodiment of this invention is substantially as follows: Assuming that an obstruction as that indicated at 21 in Fig. 4 of the drawing is met, the same engages the arms 15 or one of the same, and these arms swing about their axis lifting the wheel away as shown in this figure and giving the effect of a wheel having a radius equal to the effective radius of the arms. The arms swing until the lowermost portion 22 of the wheel 4 engages the obstruction, which is, at this stage, practically surmounted, and thus raises the arms 15 away from the surface thereof and permits them to snap back into their normal position shown in Fig. 1. In this manner, without decreasing the stability or compactness of the vehicle as a whole, it has gained the effect of a wheel of over double the diameter of the wheel with which it is provided at precisely the time at which a wheel of increased diameter is of most value.

It will thus be seen that there is provided a device in which the several objects of this invention are achieved and the above enumerated advantages are, among others, present. The entire device is simple, inexpensive and compact, and it is to be understood that it may be modified in various particulars to meet the conditions of its specific use in connection with vehicles of various types. It may here be noted, for example, that the bearing of the swinging arms is not necessarily above the entire wheel, but even if it is merely above the center of the wheel an appreciable advantage is attained. It may also be noted that the term "above" is used with reference to the position of the axis of the swinging member with respect to the center of the wheel in a broad sense and not as meaning necessarily vertically over.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

Having described my invention what I claim as new and desire to secure by Letters Patent is:

1. A vehicle provided with a wheel and with a swinging member having a non-rotary portion of longer radius than that of said wheel projecting beyond the rim of the same to engage inequalities in the path of the vehicle, said member being laterally offset from said wheel.

2. A vehicle provided with a wheel and a swinging device of greater radius than said wheel having a portion normally traveling free from the roadway and adapted to engage inequalities, said device being pivoted above the center of said wheel and the difference in heights of said pivot and said center being greater than the difference in radii of said device and said wheel whereby said device acts as a wheel of increased radius upon engaging an inequality in the roadway.

3. A wheelbarrow having a swinging device pivotally mounted above the center of its wheel and having a curved non-rotary portion normally extending in advance of the wheel to engage inequalities and aid the wheel in surmounting the same.

4. A vehicle provided with a wheel and having a device comprising a member adapted to swing about a center above the center of said wheel and formed and mounted to tend to move forwardly and yieldingly assume a normal position in advance of said wheel and engage inequalities in the path of the vehicle.

5. A vehicle provided with a wheel and having a member adapted to swing about a center above the center of said wheel and formed and mounted to extend in advance of said wheel and engage inequalities in the path of the vehicle, said wheel being formed and mounted to extend below said member in all positions thereof.

6. A vehicle provided with a wheel upon which it normally travels, and a swinging device pivotally mounted upon said vehicle at a point above the center of said wheel and provided with a lower non-rotary portion adapted at certain stages to engage inequalities upon the roadway and aid in supporting said vehicle.

7. A vehicle provided with a wheel upon which it normally travels, and a swinging device pivotally mounted upon said vehicle at a point above the center of said wheel and provided with a lower non-rotary portion adapted at certain stages to engage inequalities upon the roadway and aid in supporting said vehicle, said device being formed and mounted to tend to swing forwardly and yieldingly assume a position in which it projects horizontally beyond said wheel.

8. The combination with a wheel of a member pivoted above the center thereof and extending beneath said center, and means adapted to swing said member into a position in advance of said wheel to engage inequalities in its path, said member having a curved lower surface terminating in all positions above the lowermost portions of the wheel.

9. A vehicle provided with a wheel upon which it normally travels, a swinging device pivotally mounted upon said vehicle at a point above the center of said wheel and provided with a lower portion adapted at certain stages to engage inequalities upon the roadway and aid in supporting said vehicle, and resilient means tending to cushion the connection of said device with said vehicle.

10. A vehicle provided with a wheel upon which it normally travels, a swinging device pivotally mounted upon said vehicle at a point above the center of said wheel and provided with a lower non-rotary portion adapted at certain stages to engage inequalities upon the roadway and aid in supporting said vehicle, and means adapted to adjust the height of the pivot of said swinging member above the roadway.

11. A vehicle provided with a wheel and having a member positioned at one side of said wheel and adapted to swing about a center above the center of said wheel and formed and mounted to extend normally in advance of said wheel and engage inequalities in the path of the vehicle.

12. A vehicle provided with a wheel and having a member positioned at one side of said wheel and adapted to swing about a center above the center of said wheel and formed and mounted to extend in advance of said wheel and engage inequalities in the path of the vehicle, said member being curved to extend beneath the axle of said wheel.

13. In vehicle construction, in combination, a wheel, a swinging member pivotally mounted at a point above the center of said wheel, said member being of greater radius than said wheel and the difference in heights of the axis of said member and the center of said wheel being greater than the difference in said radii and said member being formed and mounted to tend to swing forwardly into a position in which a non-rotary portion thereof extends horizontally beyond the rim of said wheel, and means adapted to adjust the height of the pivot of said member with respect to the roadway.

14. In vehicle construction, in combination, a wheel, and a movable device laterally offset from and projecting beyond the wheel in the direction of travel in normal position and formed and mounted to engage inequalities in the path of the vehicle and aid the vehicle to pass the same.

15. In vehicle construction, in combination, a wheel, and a movable device laterally offset from and projecting beyond the wheel in the direction of travel in normal position and formed and mounted to engage and surmount inequalities in the path of the vehicle, said wheel being mounted to project below the lower surface of said device as it returns to normal position.

16. In vehicle construction, in combination, a swinging device mounted upon the vehicle and normally traveling therewith free from the road and formed to automatically engage inequalities in the path and swing the vehicle upwardly to surmount the same.

17. In vehicle construction, in combination, a swinging device mounted upon the vehicle and normally traveling therewith free from the road and formed to engage inequalities in the path and swing the vehicle upwardly to surmount the same, and a wheel of shorter radius than said swinging device upon which the vehicle normally travels, said device being formed to swing rearwardly past said wheel.

18. In vehicle construction, in combination, a swinging device mounted upon the vehicle and normally traveling therewith free from the road and formed to engage inequalities in the path and swing the vehicle upwardly to surmount the same, and a wheel of shorter radius than said swinging device upon which the vehicle normally travels, said wheel being mounted to project below the lower surface of said swinging device in all positions thereof.

19. A vehicle having a wheel, and a swinging member thereon having an upwardly curved non-rotary road engaging portion extending in advance of the wheel rim, said wheel and said swinging member being formed and mounted to alternately engage the roadway, said wheel extending lower than said swinging member.

20. A vehicle having a wheel, and a swinging device mounted thereon, said wheel being formed and mounted to project below said swinging device in all positions thereof and said swinging device being formed and mounted to normally extend beyond said wheel in the direction of travel of the vehicle.

21. A vehicle provided with a wheel upon which it normally travels, and a swinging device pivotally mounted upon said vehicle at a point above the center of said wheel and provided with a lower portion adapted at certain stages to engage inequalities upon the roadway and aid in supporting said vehicle, the difference in radii of said wheel and said swinging device being less than the difference in height of their centers.

In testimony whereof I affix my signature, in the presence of two witnesses.

ROBERT S. BLAIR.

Witnesses:
ALBERT F. NATHAN,
C. H. WILSON.

Copies of this patent may be obtained for five cents each, by addressing the "Commissioner of Patents, Washington, D. C."